though the adjusted composition mixture contains a significant amount of such an agent, the creation of the distinct liquid phases is not adversely affected.

United States Patent [19]

O'Keefe et al.

[11] 4,330,374
[45] May 18, 1982

[54] RECOVERY OF ANHYDROUS HYDROGEN IODIDE

[75] Inventors: Dennis R. O'Keefe, San Diego; Kenneth H. McCorkle, Jr., Del Mar, both of Calif.; Johannes D. de Graaf, The Hague, Netherlands

[73] Assignee: General Atomic Company, San Diego, Calif.

[21] Appl. No.: 73,566

[22] Filed: Sep. 7, 1979

[51] Int. Cl.$^3$ .............................................. B01D 3/40
[52] U.S. Cl. ...................................... 203/12; 203/35; 203/39; 203/50; 203/91; 423/488
[58] Field of Search ............... 423/481, 482, 486, 488, 423/500, 503, 579; 203/12, 35, 50, 39, 91, 51; 210/702, 710

[56] References Cited

U.S. PATENT DOCUMENTS 3,839,550  10/1974  Wentorf ............................... 423/579
4,127,644  11/1978  Norman et al. ....................... 423/481
4,176,169  11/1979  Mysels ................................. 423/488

OTHER PUBLICATIONS

"Jrnl. of A.C.S.", Aug. 1909, pp. 851-867.
"Comprehensive Inorganic Chemistry", Sneed et al., vol. III, pp. 104-108.
"Solubilities", Linke, vol. I, pp. 1110-1125.
"Chemical Engineers' Handbook", Perry, 4th Ed., 1963, page opposite front cover.

Primary Examiner—Frank Sever
Attorney, Agent, or Firm—Fitch, Even, Tabin, Flannery & Welsh

[57] ABSTRACT

Relatively dry hydrogen iodide can be recovered from a mixture of HI, $I_2$ and $H_2O$. After the composition of the mixture is adjusted so that the amounts of $H_2O$ and $I_2$ do not exceed certain maximum limits, subjection of the mixture to superatmospheric pressure in an amount equal to about the vapor pressure of HI at the temperature in question causes distinct liquid phases to appear. One of the liquid phases contains HI and not more than about 1 weight percent water. Often the adjustment in the composition will include the step of vaporization, and the distinct layers appear following the increase in pressure of the vapor mixture. Adjustment in the composition may also include the addition of an extraction agent, such as $H_3PO_4$, and even though the adjusted composition mixture contains a significant amount of such an agent, the creation of the distinct liquid phases is not adversely affected.

16 Claims, 3 Drawing Figures

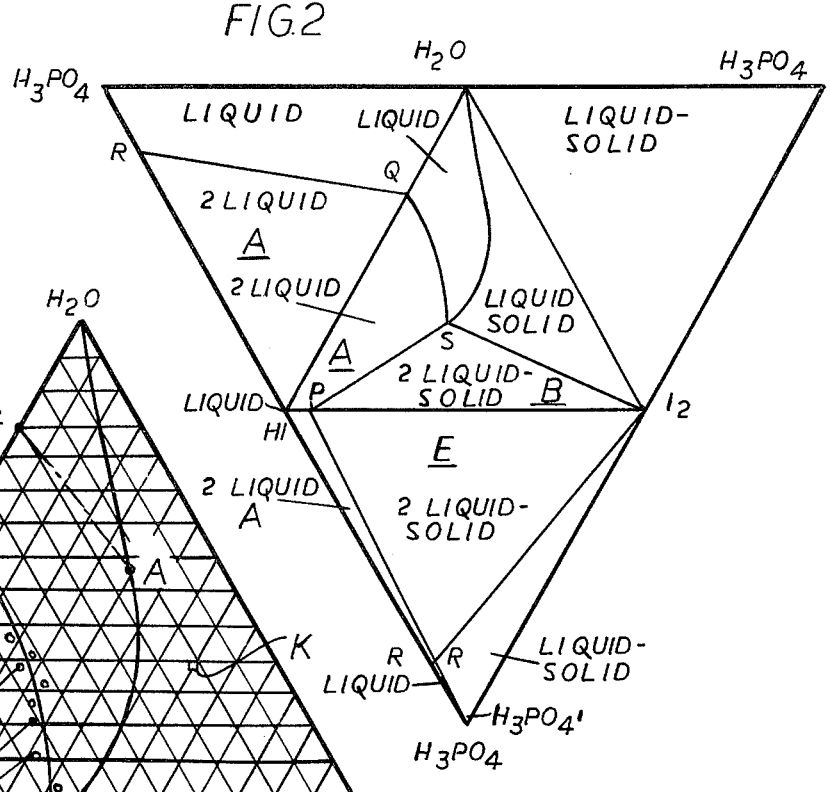
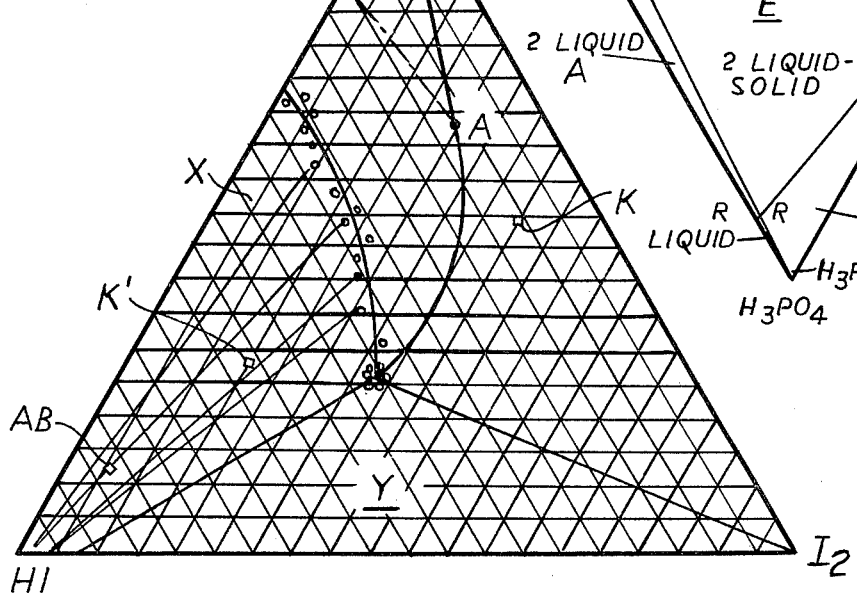
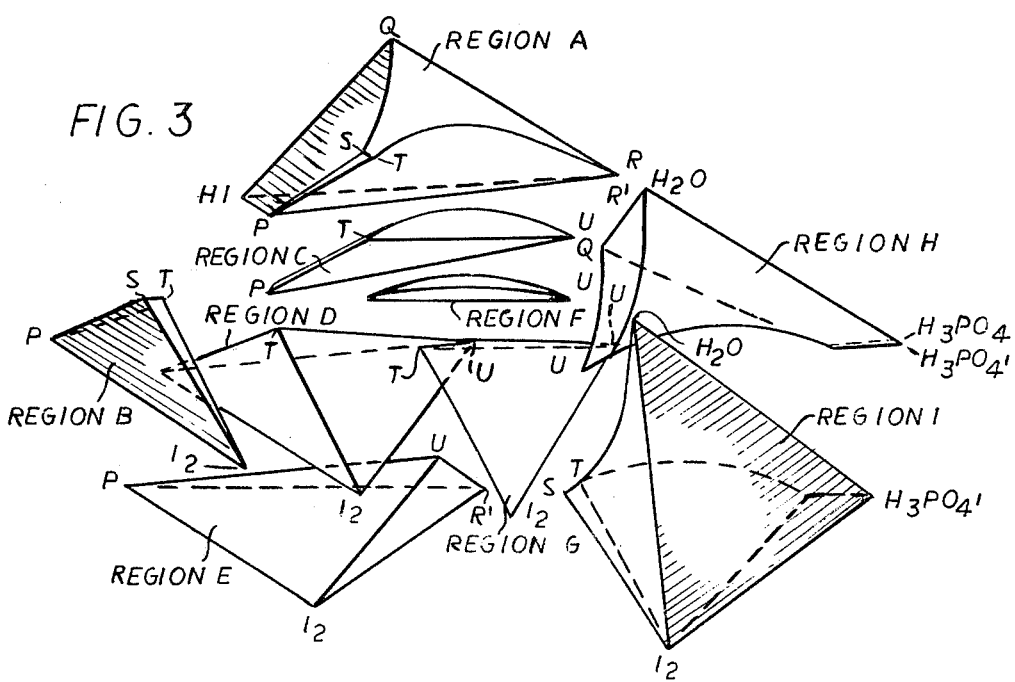

RECOVERY OF ANHYDROUS HYDROGEN IODIDE

BACKGROUND OF THE INVENTION

This invention relates to a process for the recovery of hydrogen iodide and more particularly to a process for the recovery of relatively anhydrous hydrogen iodide from a mixture containing hydrogen iodide, water and iodine.

U.S. Pat. No. 4,089,940, issued May 16, 1978 to Norman et al., discloses a process for the thermochemical production of hydrogen which is based upon the employment of the Bunsen reaction: $2H_2O + SO_2 + I_2 \rightarrow H_2SO_4 + 2HI$. In this process, the Bunsen reaction is carried out using an excess of iodine in order to create a twophase reaction mixture. The lower phase of this mixture, which is then physically separated from the upper phase, contains the major portion of the hydrogen iodide that is produced together with water and iodine. In order to efficiently recover elemental hydrogen from the hydrogen iodide component of this mixture, using a catalytic decomposition reaction or the like, it is felt necessary to first isolate relatively anhydrous hydrogen iodide.

U.S. Pat. No. 4,127,644, which issued on Nov. 28, 1978 to Norman et al., discloses an extractive distillation process for recovering hydrogen iodide from a liquid mixture of $H_2O$, $I_2$ and HI which utilizes phosphoric acid to generate a vapor stream of relatively anhydrous HI. Extractive distillation is an energy-intensive processing step and the subsequent reconcentration of the phosphoric acid is also a fairly energy-intensive step. Less energy-intensive steps or minimization of the use of such energy-intensive steps are desired.

U.S. patent application Ser. No. 921,435, filed July 3, 1978 in the name of Karol J. Mysels, now U.S. Pat. No. 4,176,169, teaches a process for the countercurrent extraction of iodine from a liquid solution containing iodine, hydrogen iodide and water by employing concentrated phosphoric acid. The percentage of iodine in such a liquid solution can be substantially reduced; of course $H_3PO_4$ is added to the solution as a result. This countercurrent extraction process can be employed preliminary to an extractive distillation process wherein a relatively anhydrous hydrogen iodide overhead stream is produced. Although such a combination of processes is less energy-intensive than effecting the entire separation through extractive distillation, work has continued in a search for further improvements.

BRIEF STATEMENT OF THE INVENTION

It has been found that, by adjusting the composition of a liquid mixture containing water, hydrogen iodide and iodine and subjecting this mixture to superatmospheric pressure, distinct liquid phases can be caused to appear. One of these phases comprises substantially anhydrous, liquid hydrogen iodide, and the proportional amount of this phase which is formed is determined by the relative proportions of the components in the mixture following the adjustment of the overall composition.

Even if a fourth component, i.e., phosphoric acid, is employed in making the adjustment and, as a result, phosphoric acid is then present as a member of the adjusted composition, distinct liquid phases are still created upon subjection to superatmospheric pressure.

BRIEF DESCRIPTION OF THE DRAWINGS

FIG. 1 is a ternary diagram, based upon mole percent, of the system HI, $I_2$ and $H_2O$;

FIG. 2 is a deployed view of the faces of the regular tetrahedron which depicts quaternary system HI, $I_2$, $H_2O$ and $H_3PO_4$; and FIG. 3 is an exploded perspective view of the individual regions of the tetrahedral diagram of the quaternary system, the faces of which are depicted in FIG. 2.

DETAILED DESCRIPTION OF THE PREFERRED EMBODIMENTS

The invention utilizes superatmospheric pressure in order to effect the creation of at least two distinct liquid phases from a mixture containing water, iodine and hydrogen iodide. Although the process disclosed in the aforementioned patent application provides a way for significantly lowering the iodine content of a liquid mixture of this type, the ultimate separation of hydrogen iodide from water is complicated by the fact that simple distillation is ineffective because hydrogen iodide and water form an azeotrope at 57.3 weight percent (w/o) HI and 42.7 w/o water. In the liquid mixture, much of the iodine will be complexed with the hydrogen iodide to form hydrogen polyiodides, e.g., $HI_3$, $HI_5$, $HI_7$, etc.; however, the complexing does not interfere with the creation of separate liquid phases which has now been discovered to occur, and accordingly, the complexing of HI and $I_2$ is not generally referred to hereinafter. Likewise, although it is convenient to speak of the overall system as a liquid mixture, in fact the various components are soluble in one another, and it would not be inappropriate to term the system a liquid solution.

It has been found that by raising the pressure of a mixture of HI, $H_2O$, and $I_2$ within a certain composition range above an appropriate minimum pressure at an appropriate temperature, it is possible to create two or more immiscible liquid phases, one of which is predominantly HI. This effects a thermodynamically efficient, spontaneous separation of HI from an $HI-H_2O-I_2$ mixture.

FIG. 1 is a ternary plot, on a mole percent basis, of the $HI-H_2O-I_2$ system which illustrates the main features of the phase behavior of the mixture. The 100 percent water point is shown at the upper peak, with the 100 percent HI point at the lower left-hand corner, and the 100 percent $I_2$ point at the lower right-hand corner. In geometrical area marked X, two immiscible liquid phases occur, and in the geometrical area marked Y, two immiscible liquid phases are also created, plus the creation of solid $I_2$.

FIG. 1 is plotted for values at room temperature, 297 K. (24° C.), and a pressure of about 730kPa (106 psia). In general, as indicated by experimental studies at higher temperatures, a separation process utilizing Region X is not strongly temperature-dependent, and although it is convenient to operate at about room temperature, temperatures as low as 0° C. and as high as 185° C. might be used. On the other hand, experimental studies indicate the depletion of the extent of Region Y upon increasing temperature, so the use of this region appears to be more limited to lower temperatures. There do not presently appear to be any advantages in operating at temperatures lower than room temperature.

Depending upon the temperature characteristics of the incoming stream of the liquid mixture to be treated, it will likely be desirable to operate at an elevated temperature. Depending upon the process steps to which the separated phase will be later subjected, there may not be any advantage in raising the temperature of this stream; however, likely it will be desirable to carry out the separation without substantial cooling so long as the corresponding pressure is considered appropriate. Although the upper temperature limit, i.e., 185° C., lies above the critical temperature of pure HI, i.e., about 150° C., it is expected that certain mixtures will exhibit a pseudocritical temperature greater than that for pure HI, for which separation of liquid phases will still be possible. Thus, the operating temperature will generally be between 0° C. and about 150° C., with operation between about 120° C. and about 150° C. being presently preferred.

Phase separation occurs when the pressure upon the mixture is increased. Although the increased pressure might be provided hydrostatically to the liquid mixture, it is usually provided by compression, and the vapor existing above such a mixture which would be compressed is mainly hydrogen iodide vapor. The amount of superatmospheric pressure which must be exerted upon the mixture at any given temperature is equal to about the vapor pressure of hydrogen iodide at that temperature. If a higher pressure is applied by compression, condensation of HI vapor results. Reference to the vapor pressure of HI in this context should be understood to be directed to the particular system which is being processed. The interaction of components within the liquid system will slightly depress the HI vapor pressure below what it would be for pure HI; however, it should be understood that a higher pressure value than that of pure HI might be required if pressurization is applied hydrostatically in the absence of a vapor phase.

In view of the foregoing, it can be seen that a higher superatmospheric pressure is required when the separation process is carried out at a higher temperature. At about room temperature (25° C.), a pressure of about 113 psia might be used, while at, for example 50° C., a pressure of about 210 psia might be used. At about 70° C., the pressure used would be about 320 psia; whereas at about 95° C., a pressure of about 510 psia would be used. Thus, the approximate vapor pressure of hydrogen iodide at a particular temperature is a consideration in determining the most feasible temperature at which to operate.

Shown in the geometric area designated X in FIG. 1 are a number of tie lines which extend between upper and lower points. These tie lines interconnect the points which represent the respective compositions of HI, $I_2$ and $H_2O$ in the two immiscible phases which are spontaneously created by the increase in pressure upon a liquid mixture having a composition lying anywhere along a tie line. The relative amount of each particular phase which is created is determined in inverse proportion to the proximity of the starting composition to the respective end points of the tie line.

For example, if the starting mixture were to have the composition marked by the point AB, which is located about one-quarter of the length of the tie line from the lower end and about three-quarters of the length from the upper end, the volume of the separate liquid phases which are created would be in a 3 to 1 ratio. The lighter phase, which is substantially entirely hydrogen iodide, would be equal to about 75 percent of the total volume, and the heavier phase which has a major portion of water would constitute about 25 percent of the volume. In most instances, the liquid phase containing the anhydrous hydrogen iodide is the lighter of the two phases. However, the density of the phases is reversed at very low iodine levels because the density of the water-bearing phase which contains only a small amount of $I_2$ is less dense than the anhydrous hydrogen iodide layer.

The two-liquid area in FIG. 1 marked X is of particular interest because one of the two resultant phases is substantially entirely hydrogen iodide. For example, the hydrogen iodide phase will usually contain not more than about 1 weight percent water and, depending upon the starting composition, there may be about 1/10th of a percent of water or less. For room temperature operation, the iodine content of this dehydrated hydrogen iodide phase will usually be in the range of about 1 to 14 weight percent. At higher temperatures the iodine content may increase; however, this phase will still contain a high percentage of hydrogen iodide. In such a two-phase system, the composition of the other phase will vary over a wider span of values, as indicated by the spread of the points at the ends of the tie lines in FIG. 1. In general, the other phase will contain between about 5 and 20 percent water and somewhere between about 40 and 65 percent hydrogen iodide, with the remainder being iodine. Numerical values for the composition of the HI phase and the other phase are available from the tie lines in FIG. 1 in mole percent.

The geometric area in FIG. 1 marked with the designation Y is a three phase region (two liquids and one solid) wherein, upon the appropriate increase in pressure, two liquid phases plus solid iodine (at a temperature below the melting point of iodine) are created. This region is termed "invariant" because the individual compositions of the three phases (including the solid $I_2$ phase) which are created remain the same regardless of the overall material balance of the starting mixture in this region that is pressurized. The location of the initial overall composition of the mixture within this geometric area determines the relative amount of the three phases; however, in each instance the phase compositions will be the same. Solid iodine will be in equilibrium with both of the liquid phases.

As earlier mentioned, in most instances the liquid HI—$I_2$—$H_2O$ mixture will not be of such a composition that it will fall within either of the geometric areas designated X and Y on the ternary diagram of FIG. 1. Should the product stream fall within either such region, then by simply increasing the hydrogen iodide pressure to the appropriate superatmospheric value, separation could be accomplished. However, normally some adjustment in the composition will be necessary, and it is anticipated that this adjustment procedure may well result in the inclusion of a fourth component into the liquid mixture. In the case where the product stream to be treated has such a large percentage of iodine that it would necessarily lie outside of the geometric regions X and Y, iodine must be removed from the mixture.

It can be seen from FIG. 1 that, in general, the iodine content will be adjusted to less than about 35 mole percent iodine when it is desired to operate efficiently within the two-liquid region, as is presently preferred. Usually the iodine content is reduced to below 20 mole percent, and preferably to below about 10 mole percent, so as to be nearer the lower end of one of the illustrated tie lines. The water content of the product stream will likely also have to be reduced, and from the diagram, it can be seen that that water content must be less than the azeotropic amount, which is indicated in FIG. 1 by a line marked AZ which represents a pseudoazeotrope after the line leaves the left-hand edge of the triangular plot. Generally, the adjustment should be such that the final composition falls below 45 mole percent water, and as earlier indicated, the water content is preferably reduced to less than about 15 mole percent so as to lie near the lower end of one of the tie lines.

Adjustment by reducing the amount of the iodine and/or water components may be effected using any suitable method or additive; however, any additive to the mixture which dissolves therein should be one which does not adversely affect the creation of the two immiscible phases upon subsequent application of superatomospheric pressure. Phosphoric acid is one such agent which is effective in both reducing the iodine content and in shifting the pseudoazeotrope line toward the $H_2O$—$I_2$ axis, thereby allowing other process steps to be effected which will reduce the water content below the initial pseudoazeotropic line. If sufficient $H_3PO_4$ is used, the azeotrope can be broken. In accomplishing this objective phosphoric acid dissolves in the aqueous mixture, and so long as it remains in solution, a three-dimensional quaternary plot, as opposed to a ternary plot, becomes necessary to describe the system. Such a plot is depicted in FIG. 3. Testing has shown that the presence of dissolved phosphoric acid does not detract from the inventive concept, namely the spontaneous creation of a dehydrated liquid hydrogen iodide phase upon the application of a certain amount of superatmospheric pressure.

FIG. 2 depicts the four separate faces of the regular tetrahedron quaternary plot with the values shown in mole percent. The exploded perspective view of this regular tetrahedron in FIG. 3 shows each individual three-dimensional region for the HI—$I_2$—$H_2O$—$H_3PO_4$ quaternary system. The center triangle of FIG. 2 represents the face of the tetrahedron where the phosphoric acid level is zero and is the same as the ternary plot shown in FIG. 1. The letters "P" through "U" are used in FIGS. 2 and 3 to label the various corners of the different regions in order to facilitate understanding how the various regions interface with one another.

There are several three-dimensional regions within this quaternary system where it is possible for the separation process to operate. Region A, which appears in the upper center of FIG. 3, is a two-liquid region that is the continuation of the two-liquid region which was referred to as Region X in FIG. 1 wherein one liquid phase is substantially anhydrous HI and the other phase is an aqueous phase. Another face of this three-dimensional Region A appears in the ternary diagram at upper left-hand corner of FIG. 2 which is the ternary diagram for HI—$H_2O$—$H_3PO_4$.

As in the case of the ternary plot illustrated in FIG. 1, the quaternary diagram is considered to be relatively temperature insensitive. The pressure considerations mentioned before likewise affect the quaternary system, namely, superatmospheric pressure of about the vapor pressure of hydrogen iodide at that temperature is applied. For example, one mixture falling within the Region A was exposed at room temperature to a pressure of about 110 psia, and two liquid phases were formed. The lower phase was analyzed and was found to contain 95.7 mole percent HI, 3.2 mole percent iodine, 0.48 mole percent $H_3PO_4$ and 0.57 mole percent water. On a weight percent basis this is equal to about 93.3 weight percent HI and about 0.08 weight percent water. Other mixtures falling within Region A, when exposed to similar pressure, have resulted in the creation of a bottom phase in which water is not present in a measurable quantity.

Region B, which appears near the left-hand edge of FIG. 3, is a two-liquid-solid region which is a continuation of the same invariant region previously referred to as Area Y in FIG. 1. Although Region B is relatively shallow in its penetration into the tetrahedral volume, its two liquid phases include an almost pure HI phase and it thus remains of potential interest. Three-dimensional Region B does not have the property of invariancy which was true of the geometric Area Y which lies on the face of the tetrahedron.

Region C, which appears below Region A in FIG. 3, is a three-liquid region which lies entirely internal of the tetrahedral volume. Two of the three liquid phases are aqueous phases, with one being relatively high in iodine relatively low in phosphoric acid and with the other being higher in phosphoric acid and lower in iodine. The third liquid phase is almost pure HI and herein lies the potential utility of operation in this region. As an example, one mixture falling within Region C was subjected to about 110 psia at room temperature, and the middle phase of the three phases which formed was tested and found to contain 94.1 mole percent HI and less than 1 mole percent $H_2O$.

Region D is a pyramidal region which is entirely internal to the regular tetrahedron and is a 3-liquid-1-solid region that is invariant in its individual phase compositions (as discussed hereinbefore with respect to geometric Area Y). Region D appears generally centrally within FIG. 3, just to the right of Region B, and it extends downward to the $I_2$ apex. Accordingly, the other three points which define the apices of this pyramid define the compositions of the three immiscible liquid phases that are created. The phase of intermediate density of the 3-liquid phases which are so created as a result of treatment of a composition in this region is of particular interest inasmuch as it is primarily HI with less than about 1 mole percent water.

Region E is another pyramid-shaped region, which is located below Region D in the tetrahedral plot and is a 2-liquid-1-solid region wherein the composition of the resultant immiscible phases varies. The bottom liquid phase has an HI content of more than 90 mole percent and a water content of less than 1 mole percent and is the region of interest. One intended use of this phase, as well as the corresponding phases of the other regions, is to provide an anhydrous hydrogen iodide feed stream for a catalytic cracking process.

Region F is a relatively small, elongated region which also lies entirely internally of the tetrahedron. It is a 2-liquid region but neither liquid phase has a composition which appears to be of particular interest. Region G is wedge-shaped and positioned generally centrally within FIG. 3; it extends to the $I_2$ apex. Region G is a 2-liquid-1-solid region which also does not appear to have a liquid phase composition of particular interest.

Region H is a large aqueous solution region which extends upward to the $H_2O$ apex and also downward to the $H_3PO_4$ apex but which does not create separate phases upon the application of high pressure. Region I is a liquid-solid $I_2$ region which, similar to Region H, does not result in the creation of immiscible liquid phases.

In general, room temperature operation in any one of Regions A through E is effective in producing an immiscible liquid phase which comprises at least about 90 mole percent hydrogen iodide, less than 1 mole percent water, less than 1 mole percent $H_3PO_4$ and less than 7 mole percent $I_2$ (which is the saturation level of iodine in hydrogen iodide at about room temperature), and higher temperatures are not considered to adversely affect the creation of immiscible phases. Accordingly, depending upon the composition of the incoming stream which is being provided, a decision is made as to how best to adjust the composition in order to bring it to a desired location within a particularly favorable region. If, for example, phosphoric acid is to be employed in the adjustment steps, standard chemical engineering techniques are employed in order to determine the most favorable overall process from an economic standpoint. These considerations normally include assessments of the equipment that will be required, the overall processing time and prospective energy requirements, as well as the step-by-step yields and the amount of recycling necessary in what would likely be operated as a continuous process. For example, it is preferred to adjust the stream to a composition such that the desired anhydrous HI phase constitutes at least about 50 volume percent of the stream being pressurized; however, other factors may dictate that operation be carried out under conditions where the desired phase constitutes as little as 20 volume percent.

The following Example outlines one embodiment of the separation process wherein one particular characteristic of the ternary phase diagram (FIG. 1) is utilized. It should be understood, however, that this Example is merely illustrative of one such process and in no way defines the limits of the invention concept—there being in addition many different process separation configurations. For example, there are potential configurations wherein mixtures containing $H_3PO_4$ could be separated directly (per FIG. 3) without the necessity of distillation of $H_3PO_4$-free, HI, $I_2$, $H_2O$ mixtures, as depicted in the particular Example presented. The choice of separation method is contingent on a number of factors which would be considered in optimizing a system to treat a particular process configuration.

EXAMPLE

Based on one particular application of thermochemical water-splitting, a liquid stream results from the lower acid phase of the Bunsen reaction having a composition of about 39 mole percent $I_2$, 12 mole percent HI, and 49 mole percent $H_2O$. Its temperature is about 95° C., and its pressure about 30 psia. The above composition is plotted on FIG. 1 as reference point K. Because point K is far from both Regions X and Y (where liquid-liquid separations can be caused to occur) some treatment is required in order to make use of the separation technique.

The liquid stream is first treated in a countercurrent iodine knock-out column where it is caused to flow in countercurrent liquid-liquid contact with a 95 weight percent $H_3PO_4$ aqueous stream. The flow rate of the phosphoric acid stream is about 0.75 times the molar flow of the incoming composition being treated, and an exothermic reaction takes place within the column which raises the exit temperature to about 150° C. The stream leaving the bottom of the column, under these conditions, is almost pure $I_2$—having a composition of about 98 weight percent $I_2$ and 2 weight percent $H_3PO_4$. The stream exiting at the top of the knockout column is composed of about 6 mole percent HI, 2 mole percent $I_2$, 47 mole percent $H_2O$, and 45 mole percent $H_3PO_4$, which falls within the single-liquid region H of FIG. 3. The temperature and pressure of this exit stream are about 150° C. and 30 psia, and the molar flow of this exit stream is about 150 percent of the incoming stream.

The exit stream is supplied to the top end of a countercurrent, multiple-plate, extractive distillation column. About 100 percent $H_3PO_4$ is also supplied to the column at a flow rate equivalent to about 0.05 of the molar flow of the infeed stream having composition K. Exiting from the bottom of the distillation column at about 150° C. is about an 85 weight percent aqueous solution of $H_3PO_4$. Exiting from the top is an HI, $I_2$, $H_2O$ gaseous stream, the composition of which is mainly controlled by the design of distillation column, i.e., the amount of $H_2O$ in this gaseous stream can be adjusted (almost independently of the HI and $I_2$ composition) by the choice of the number of plates in the distillation column; of course, the temperature also has an overall effect. The aforestated operating conditions create an exiting gas stream having a composition which is 57 mole percent HI, 15 mole percent $I_2$, and 28 mole percent $H_2O$. This composition is depicted by the point K' on FIG. 1 and lies within Region X. This exiting stream has a mole flow rate about 0.18 times that of the incoming feed stream of composition K.

This gaseous stream is compressed and adjusted in temperature (if desired) to effect separation. Although compression to about 110 psia. at room temperature would be effective, higher temperatures and pressures are desirable in order to obtain a hydrogen iodide liquid stream which is suitable for catalytic decomposition as the next step of an overall scheme to provide $H_2$. To this end, the exiting gas stream is lowered to about 120° C., and its pressure is raised to about 750 psia. The resulting liquid mixture spontaneously divides into two immiscible liquids of comparable volume—the upper liquid being the dehydrated HI phase having a composition of about 97 mole percent HI with the remainder being mainly $I_2$ with less than 0.5% $H_2O$ and the lower liquid phase having a composition of about 33 mole percent HI, 22 mole percent $I_2$, and 45 mole percent $H_2O$. The upper phase is separated and can be delivered directly to an HI catalytic decomposition stage, and the lower phase is recycled to the appropriate plate of the multi-stage distillation column. The upper dehydrated HI phase constitutes about 50 volume percent of the compressed mixture; thus, the spontaneous liquid-liquid separation technique provides an essentially water-free composition without having to completely distill the HI, $I_2$, $H_2O$ mixture and while requiring only a small fraction of the amount of 100 percent $H_3PO_4$ otherwise needed.

Although the invention has been described with regard to certain preferred embodiments which constitute the best mode presently contemplated by the inventors for carrying out this invention, it should be understood that various changes and modifications which would be obvious to one having the ordinary skill in this art may be made without departing from the scope of the invention which is defined solely by the claims which follow. Various features of the invention are emphasized in the claims appended hereto.

What is claimed is:

1. A method for obtaining relatively dry hydrogen iodide from a mixture which includes HI, iodine and water, which method comprises adjusting the pressure and composition of said mixture to superatmospheric pressures between 0° C.

and 185° C., sufficient to provide two distinct liquid phases therefrom, one phase having a major portion of HI and not more than 1 weight % water; recovering such one phase from the other of such phases.

2. A method in accordance with claim 1 wherein said mixture is adjusted to a composition that contains not more than 35 mole percent $I_2$ and 45 mole percent $H_2O$, based upon total moles of $I_2$, $H_2O$ and HI and to a pressure at least about the vapor pressure of HI at the temperature of said mixture.

3. A method in accordance with claim 2 wherein said mixture is vaporized during said adjustment step.

4. A method in accordance with claim 1 wherein said step of creating distinct liquid phases is carried out at a temperature between about 0° C. and about 150° C. and said adjustment is to within geometric region X or Y of FIG. 1.

5. A method in accordance with claim 1 wherein said adjustment in composition is made by the addition of phosphoric acid to said mixture.

6. A method for obtaining relatively dry hydrogen iodide from a mixture which includes HI, iodine and water, which method comprises
adjusting the pressure and composition of said mixture, by extractive distillation, to superatmospheric pressures between 0° C. and 185° C., to provide distinct liquid phases therefrom in an overhead exit stream, one phase having a major portion of HI and not more than 1 weight % water;
recovering such one phase from the other of such phases.

7. A method in accordance with claim 6 wherein said extractive distillation is carried out with the addition of phosphoric acid to said mixture.

8. A method in accordance with claim 7 wherein said adjusted composition mixture contains a significant amount of $H_3PO_4$.

9. A method in accordance with claim 8 wherein said one liquid phase contains not more than about 1 weight percent $H_3PO_4$ based upon weight of HI.

10. A method in accordance with claim 7 wherein substantially all of said $H_3PO_4$ is removed from said adjusted composition mixture during said extractive distillation.

11. A method in accordance with claim 7 wherein the overhead stream from said extractive distillation is increased in pressure and creates distinct liquid phases wherein said one phase constitutes at least about 50 volume percent thereof.

12. A method in accordance with claim 7 wherein said overhead exit stream has a composition which falls within one of the geometric regions designated A, B, C, D, E, F or G on the quaternary diagram of FIG. 3.

13. A method in accordance with claim 12 wherein countercurrent extraction with phosphoric acid is carried out prior to said distillation.

14. A method for obtaining relatively dry hydrogen iodide from a mixture which includes HI, iodine and water, which method comprises
adjusting the composition of the mixture by adding phosphoric acid to said mixture so that the resultant mixture has a composition which falls within one of the geometric regions designated A, B, C, D, E, F or G on the quaternary diagram of FIG. 3 and subjecting the mixture to a pressure at least nearly equal to the pressure of hydrogen iodide at the temperature thereof to cause distinct liquid phases to appear, one of which phases comprises HI and not more than about 1 weight percent $H_2O$ based upon weight of HI, and
separating said one liquid phase from the remainder that is immiscible therewith by physically removing said one phase therefrom.

15. A method in accordance with claim 14 wherein said adjustment includes the step of extractive distillation.

16. A method in accordance with claim 15 wherein said one liquid phase contains not more than about 1 weight percent $H_3PO_4$ based upon weight of HI.

* * * * *